(12) United States Patent
Rosenberg

(10) Patent No.: US 9,769,422 B2
(45) Date of Patent: *Sep. 19, 2017

(54) METHODS AND SYSTEM FOR SIMULATED 3D VIDEOCONFERENCING

(71) Applicant: Polycom, Inc., San Jose, CA (US)

(72) Inventor: Yaakov Moshe Rosenberg, Even Yehuda (IL)

(73) Assignee: Polycom, Inc., San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/279,584

(22) Filed: May 16, 2014

(65) Prior Publication Data

US 2014/0247321 A1 Sep. 4, 2014

Related U.S. Application Data

(63) Continuation of application No. 13/105,290, filed on May 11, 2011, now Pat. No. 8,736,660.

(60) Provisional application No. 61/452,270, filed on Mar. 14, 2011.

(51) Int. Cl.
*H04N 7/15* (2006.01)
*G02B 27/22* (2006.01)
*H04N 13/04* (2006.01)
*G06F 3/01* (2006.01)

(52) U.S. Cl.
CPC .............. *H04N 7/15* (2013.01); *G02B 27/22* (2013.01); *G06F 3/013* (2013.01); *H04N 13/0484* (2013.01); *H04N 2213/006* (2013.01)

(58) Field of Classification Search
CPC combination set(s) only.
See application file for complete search history.

(56) References Cited

U.S. PATENT DOCUMENTS

| | | | |
|---|---|---|---|
| 7,659,920 B2 | 2/2010 | Cohen et al. | |
| 2005/0093971 A1* | 5/2005 | Ono ...................... | H04N 7/15 348/14.09 |
| 2005/0237376 A1 | 10/2005 | Roessler et al. | |
| 2006/0087553 A1 | 4/2006 | Kenoyer et al. | |
| 2006/0139371 A1* | 6/2006 | Lavine ................... | G06F 3/14 345/620 |
| 2007/0159523 A1 | 7/2007 | Hillis et al. | |
| 2008/0291265 A1 | 11/2008 | Wagner et al. | |
| 2010/0284082 A1 | 11/2010 | Shpunt et al. | |
| 2010/0315482 A1 | 12/2010 | Rosenfeld et al. | |
| 2010/0328492 A1 | 12/2010 | Fedorovskaya et al. | |
| 2011/0170060 A1* | 7/2011 | Gordon .................. | A61B 3/113 351/206 |
| 2011/0267422 A1 | 11/2011 | Garcia et al. | |
| 2012/0194631 A1* | 8/2012 | Venolia .................. | H04N 7/142 348/14.1 |

* cited by examiner

*Primary Examiner* — Joseph J Nguyen
(74) *Attorney, Agent, or Firm* — Blank Rome, LLP

(57) ABSTRACT

A system and method for manipulating images in a videoconferencing session provides users with a 3-D-like view of one or more presented sites, without the need for 3-D equipment. A plurality of cameras may record a room at a transmitting endpoint, and the receiving endpoint may select one of the received video streams based upon a point of view of a conferee at the receiving endpoint. The conferee at the receiving endpoint will thus experience a 3-D-like view of the presented site.

14 Claims, 5 Drawing Sheets

METHODS AND SYSTEM FOR SIMULATED 3D VIDEOCONFERENCING

CROSS REFERENCE TO RELATED APPLICATIONS

This Application is a continuation of U.S. application Ser. No. 13/105,290 entitled "Methods and System for Simulated 3D Videoconferencing" filed May 11, 2011, which claims priority to U.S. Provisional Application Ser. No. 61/452,270 filed Mar. 14, 2011, all of which are incorporated by reference in their entirety herein.

TECHNICAL FIELD

The present invention relates to the field of communication, and in particular to the field of videoconferencing.

BACKGROUND ART

Videoconferencing enables individuals located remotely one from the other to conduct a face-to-face meeting. Videoconferencing may be executed by using audio and video telecommunications. A videoconference may be between as few as two sites (point-to-point), or between several sites (multi-point). A conference site may include a single participant (user) or several participants (users). Videoconferencing may also be used to share documents, presentations, information, and the like.

Participants may take part in a videoconference via a videoconferencing endpoint (EP), for example. An endpoint (EP) may be a terminal on a network, for example. An endpoint may be capable of providing real-time, two-way, audio/visual/data communication with other terminals and/or with a multipoint control unit (MCU). An endpoint (EP) may provide information/data in different forms, including audio; audio and video; data, audio, and video; etc. The terms "terminal," "site," and "endpoint" may be used interchangeably. In the present disclosure, the term endpoint may be used as a representative term for above group.

An endpoint may comprise a display unit (screen), upon which video images from one or more remote sites may be displayed. Example endpoints include POLYCOM® VSX® and HDX® series endpoints, each available from Polycom, Inc. (POLYCOM, VSX, and HDX are registered trademarks of Polycom, Inc.) A videoconferencing endpoint may send audio, video, and/or data from a local site to one or more remote sites, and display video and/or data received from the remote site(s) on its screen (display unit).

Video images displayed on a screen at an endpoint may be displayed in an arranged layout. A layout may include one or more segments for displaying video images. A segment may be a predefined portion of a screen of a receiving endpoint that may be allocated to a video image received from one of the sites participating in the videoconferencing session. In a videoconference between two participants, a segment may cover the entire display area of the screens of the endpoints. In each site, the segment may display the video image received from the other site.

An example of a video display mode in a videoconference between a local site and multiple remote sites may be a switching mode. A switching mode may be such that video/data from only one of the remote sites is displayed on the local site's screen at a time. The displayed video may be switched to video received from another site depending on the dynamics of the conference.

In contrast to the switching mode, in a continuous presence (CP) conference, a conferee (participant) at a local endpoint may simultaneously observe several other conferees from different endpoints participating in the videoconference. Each site may be displayed in a different segment of the layout, which is displayed on the local screen. The segments may be the same size or of different sizes. The combinations of the sites displayed on a screen and their association to the segments of the layout may vary among the different sites that participate in the same session. Furthermore, in a continuous presence layout, a received video image from a site may be scaled, up or down, and/or cropped in order to fit its allocated segment size. It should be noted that the terms "conferee," "user," and "participant" may be used interchangeably. In the present disclosure, the term conferee may be used as a representative term for above group.

An MCU may be used to manage a videoconference. An MCU is a conference controlling entity that is typically located in a node of a network or in a terminal that receives several channels from endpoints and, according to certain criteria, processes audio and/or visual signals and distributes them to a set of connected channels.

Exemplary MCUs include the MGC-100 and RMX 2000®, available from Polycom Inc. (RMX 2000 is a registered trademark of Polycom, Inc.). Some MCUs may be composed of two logical units: a media controller (MC) and a media processor (MP). A more thorough definition of an endpoint and an MCU may be found in the International Telecommunication Union ("ITU") standards, including the H.320, H.324, and H.323 standards. Additional information regarding the ITU standards may be found at the ITU website www.itu.int.

In a CP videoconferencing session, the association between sites and segments may be dynamically changed according to the activities taking part in the conference. In some layouts, one of the segments may be allocated to a current speaker, for example. The other segments of that layout may be allocated to other sites that were selected as presented sites or presented conferees. A current speaker may be selected according to certain criteria, including having the highest audio signal strength during a certain percentage of a monitoring period. The other presented sites, may include the image of the conferee that was the previous speaker; the sites having audio energy above a certain thresholds; certain conferees required by management decisions to be visible; etc.

In a conventional CP videoconference, each layout is associated with a video output port of an MCU. A conventional video output port may comprise a CP image builder and an encoder. A conventional CP image builder may obtain decoded video images of each one of the presented sites. The CP image builder may scale and/or crop the decoded video images to a required size of a segment in which the image will be presented. The CP image builder may further write the scaled image in a CP frame memory in a location that is associated with the location of the segment in the layout. When the CP frame memory is completed with all the presented images located in their associated segments, the CP image may be read from the CP frame memory by the encoder.

The encoder may encode the CP image. The encoded and/or compressed CP video image may be sent toward the endpoint of the relevant conferee. A frame memory module may employ two or more frame memories, for example, a currently encoded frame memory and a next frame memory. The memory module may alternately store and output video of consecutive frames. Conventional output ports of an MCU are well known in the art and are described in a plurality of patents and patent applications. A reader who wishes to learn more about a conventional output port is invited to read U.S. Pat. No. 6,300,973, for example, the content of which is incorporated herein by reference in its entirety.

A user's experience of videoconference is typically limited to one or more high-resolution two-dimensional displays. Although 3D (3-dimension) technologies have become more and more popular in other different fields, such as movies, media entertainment, etc., obstacles have prevented the 3D technology from being implemented by the videoconference industry. These obstacles include the need to wear special 3D glasses and the use of expensive cameras and displays. Creation of holograms may require special screens, cameras, and hardware that are very expensive, etc. Therefore, it is not realistic to expect conventional videoconferencing users to pay such high costs. Nor is it realistic to expect conventional videoconferencing users to sit in a videoconference wearing 3D glasses, which would be visible to other conferees.

Furthermore, many companies have invested in a conventional 2D video conferencing infrastructure. Those companies would like to keep their capital investment in their current video conferencing infrastructure that does not support current existing 3D video conferencing techniques.

The above-described deficiencies in videoconferencing do not limit the scope of the inventive concepts of the present disclosure in any manner. The deficiencies are presented for illustration only.

SUMMARY OF INVENTION

The below disclosed embodiments provide a novel system and method for manipulating a video image in videoconference such that a user may experience a 3D-like view of one or more presented sites. The disclosed exemplary embodiments do not require 3D cameras, 3D screens, 3D glasses, or hologram display hardware. On the contrary, the disclosed embodiments may utilize conventional 2D video cameras and conventional 2D video screens to create a 3D-like view of one or more presented sites.

In one embodiment, a transmitting endpoint in a site may comprise two or more video cameras, each of which may record the room of the site from a different angle. The transmitting endpoint may encode each video image and send the encoded streams to an MCU.

At the MCU, each of the received video streams from a plurality of conferees is transferred toward an associated input video port. In addition to the conventional components of an input video port, an input video port may comprise a conferee-point-of-view detector (CPOVD). The CPOVD may detect the angle at which the conferee looks at the screen and at which region of the screen the conferee is looking. The CPOVD may send the detected information toward a controller of the MCU.

As long as the video image of a transmitting endpoint, which has two or more cameras, is embedded in the video image that is sent toward one or more receiving endpoints, the controller may periodically sample the stored information regarding the received conferee's point-of-view direction. Once a change in the viewer's point of view has been detected, the controller may determine whether to continue using the video streams from the currently chosen camera, to select a video stream received from another camera of that transmitting endpoint, etc.

The viewer, in the receiving endpoint, will experience a 3D-like view of the presented sites. This experience may be affected by the number and location of the cameras in the transmitting endpoint. To enhance the experience, more cameras may be placed and along an arc wherein the center of the arc is located near to or on the centerline of the display at the transmitting site. Furthermore, the accuracy of the viewer-point-of-view detector may also affect the experience of the user.

Other different techniques may be used to enhance the viewer's experience. Exemplary techniques include using a "sliding window," for example. The sliding window imitates the effect of controlling the far end camera such as move left, right, up and down. In some embodiments, the movement of the receiving conferee's gaze may be used as a remote camera panning left or right, tilting up or down or zooming in or out. In some embodiments, the video received from the remote location may be cropped to a window that is presented on screen and slides along the video image. For example, if the conferee gaze detector indicates that the gaze of the conferee points at the most left side of the screen, the effect on the screen may resemble a panning left of the remote camera, although in this embodiment only the presented window is sliding to the left and the remote camera is not panning left. Once the conferee point of view is locked on the area in which the conferee is interested, the window may slide until it will eventually stop. In the above embodiment, the stopping point may be the point in which the conferee is staring to the center of the conferee's screen.

The present disclosure is not limited to providing a 3D-like view of only one site. One or more sites may comprise a plurality of cameras. The number of segments displayed in a layout on a conferee screen as well as the conferee's screen size may affect the 3D-like experience.

These and other aspects of the disclosure will be apparent in view of the attached figures and detailed description. The foregoing summary is not intended to summarize each potential embodiment or every aspect of the present invention, and other features and advantages of the present invention will become apparent upon reading the following detailed description of the embodiments with the accompanying drawings and appended claims.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

Figure 1:
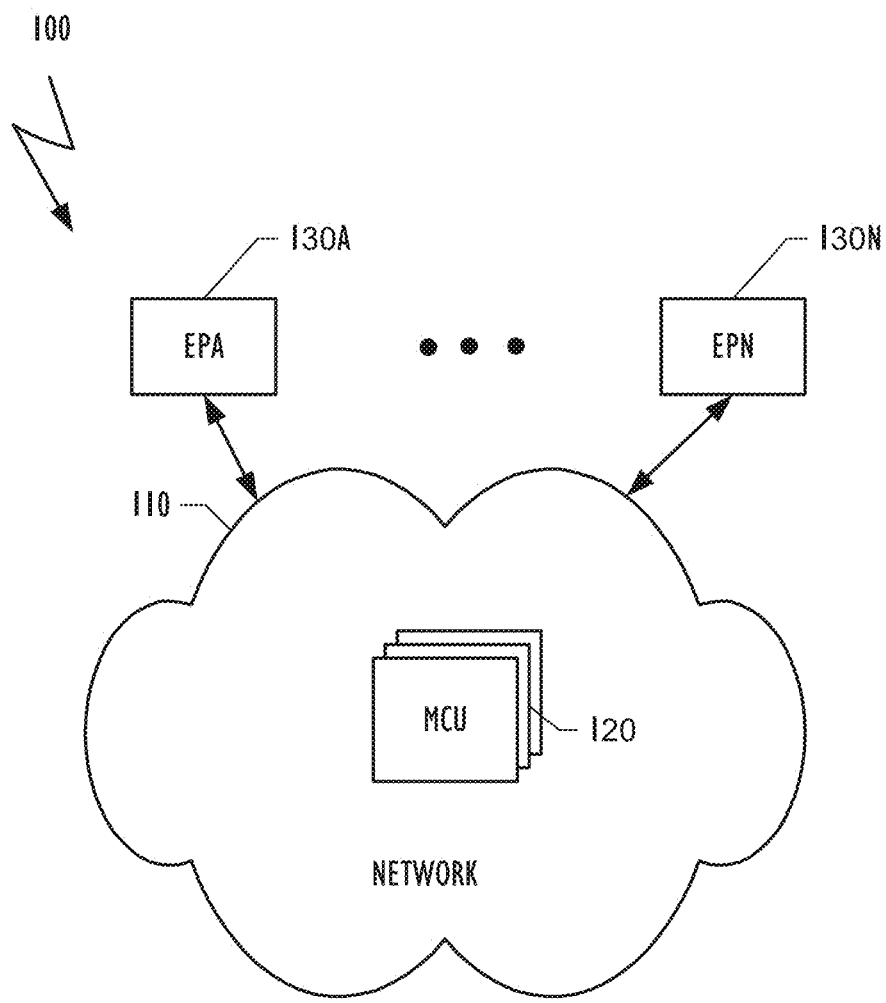
FIG. 1 is a block diagram illustrating relevant elements of a portion of a multimedia multipoint videoconferencing system according to one embodiment.

FIG. 1 illustrates elements of an exemplary multimedia multipoint conferencing system 100 according to one embodiment. System 100 may include a network 110, one or more multipoint control units (MCU) 120, and a plurality of endpoints in different sites 130a-n. Network 110 may be a packet switched network, a circuit switched network or any combination of the two, for example. The multimedia communication over the network may be based on a communication protocol, including H.320, H.323, SIP, etc.

MCU 120 and endpoints 130a-n may be adapted to operate according to various embodiments to improve the experience of a conferee looking at a CP video image of a multipoint video conference. In embodiments implementing a centralized architecture, MCU 120 may be adapted to perform the automatic display adaptation methods described herein. Alternatively, in a distributed architecture, endpoints 130a-n with MCU 120 may be adapted to perform the automatic display adaptation methods. More information about the operation of MCU 120 and endpoints 130a-n according to various embodiments is disclosed below.

Figure 2A:
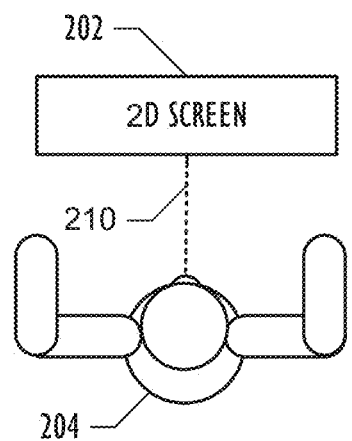
FIGS. 2a-2c illustrate different instances during a video conferencing session, in which a conferee has different viewpoint in each instance.
Figure 2B:
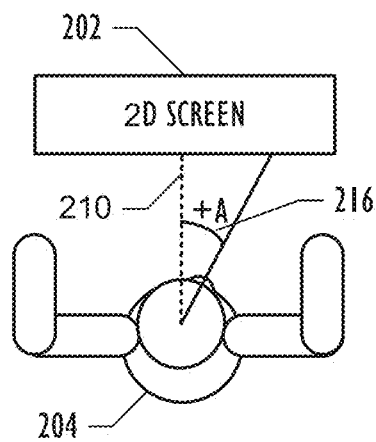
Figure 2C:
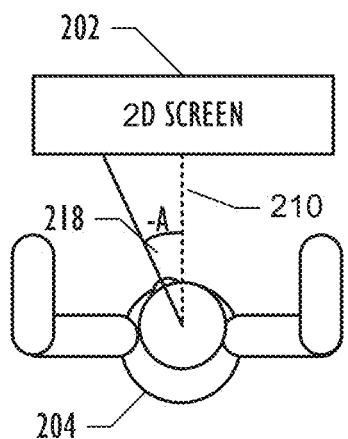

FIGS. 2a-2c illustrate different instances during a video conferencing session in which a conferee 204 has a different viewpoint in each instance. In FIG. 2a, conferee 204 looks at the center along the perpendicular 210 of the two-dimensional screen 202 of the conferee's EP. In FIG. 2b, the head of conferee 204 is rotated to the right side of the screen 202 and creates an angle 216 of +A degrees between the face (the nose) of the conferee and the perpendicular 210 to the screen. In FIG. 2c, the head of conferee 204 is rotated to the left side of the screen 202 and creates an angle 216 of −a degrees between the face (the nose) of the conferee and the perpendicular 210 to the screen.

Figure 3:
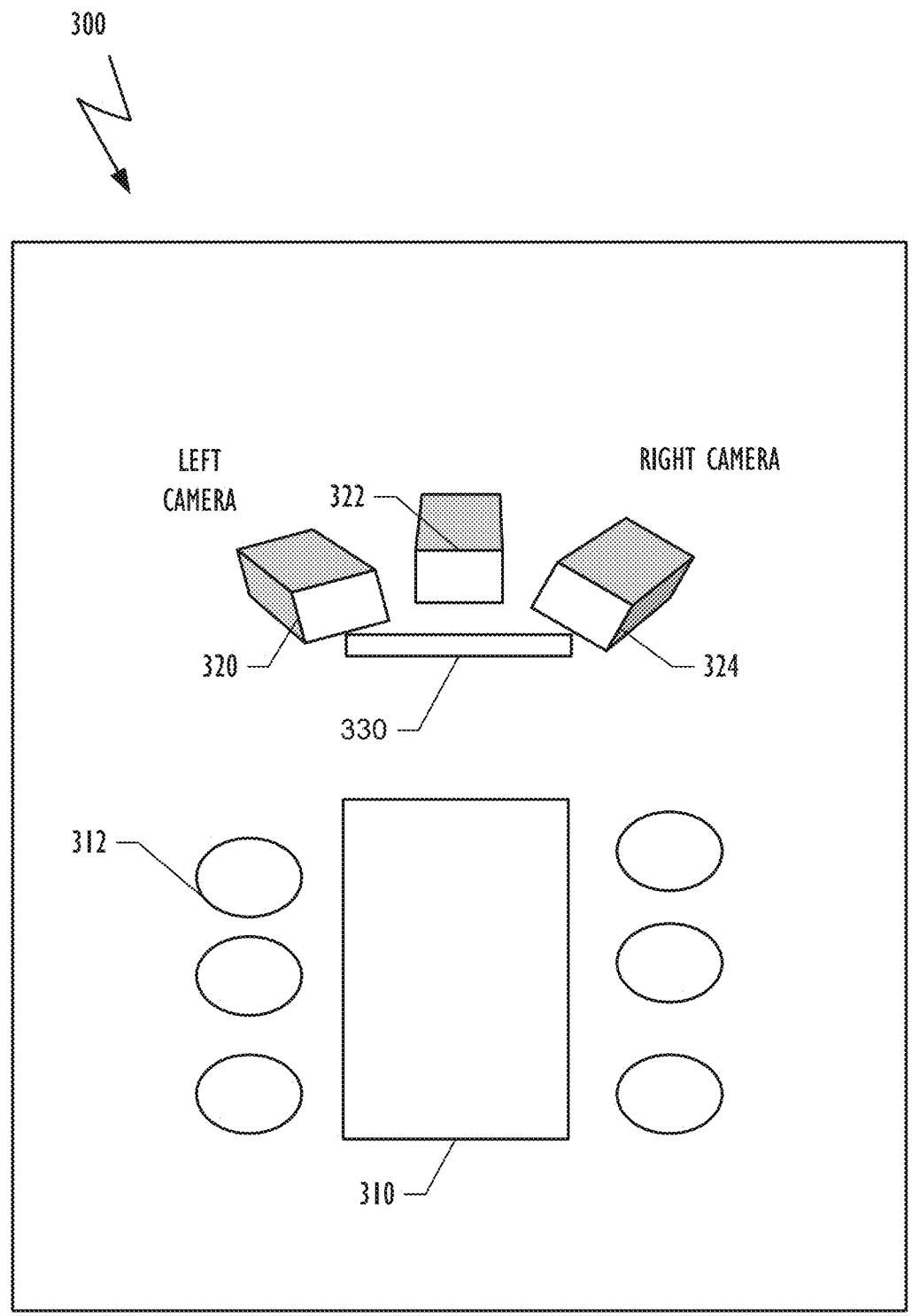
FIG. 3 is a block diagram illustrating relevant elements of portions of a transmitting site according to one embodiment.

FIG. 3 illustrates a block diagram with relevant elements of portions of a transmitting site 300 according to one embodiment. Transmitting site 300 may be a meeting room having a table 310, a plurality of chairs 312, and a video-conferencing endpoint 330 having a plurality of video cameras 320, 322, and 324. The plurality of cameras may be located in a horizontal plane above the screen of the EP 330 along a virtual arc. Each camera captures the table 310 and the conferees along the table from a different angle simulating a different head position of a conferee that receives a video stream from the meeting room 300. Each of the video cameras 320, 322, and 324 creates and delivers a stream of video images to the endpoint 330. The endpoint 330 compresses the three video streams and sends the compressed video streams toward an MCU 120 that conducts the video conferencing session. Compressing the three video streams may be done in a single encoder that complies with the compression standard H.264 MVC, for example. Other endpoints may use three separate encoders and may send three separate compressed video streams, one for each of cameras 320, 322, and 324.

Figure 4:
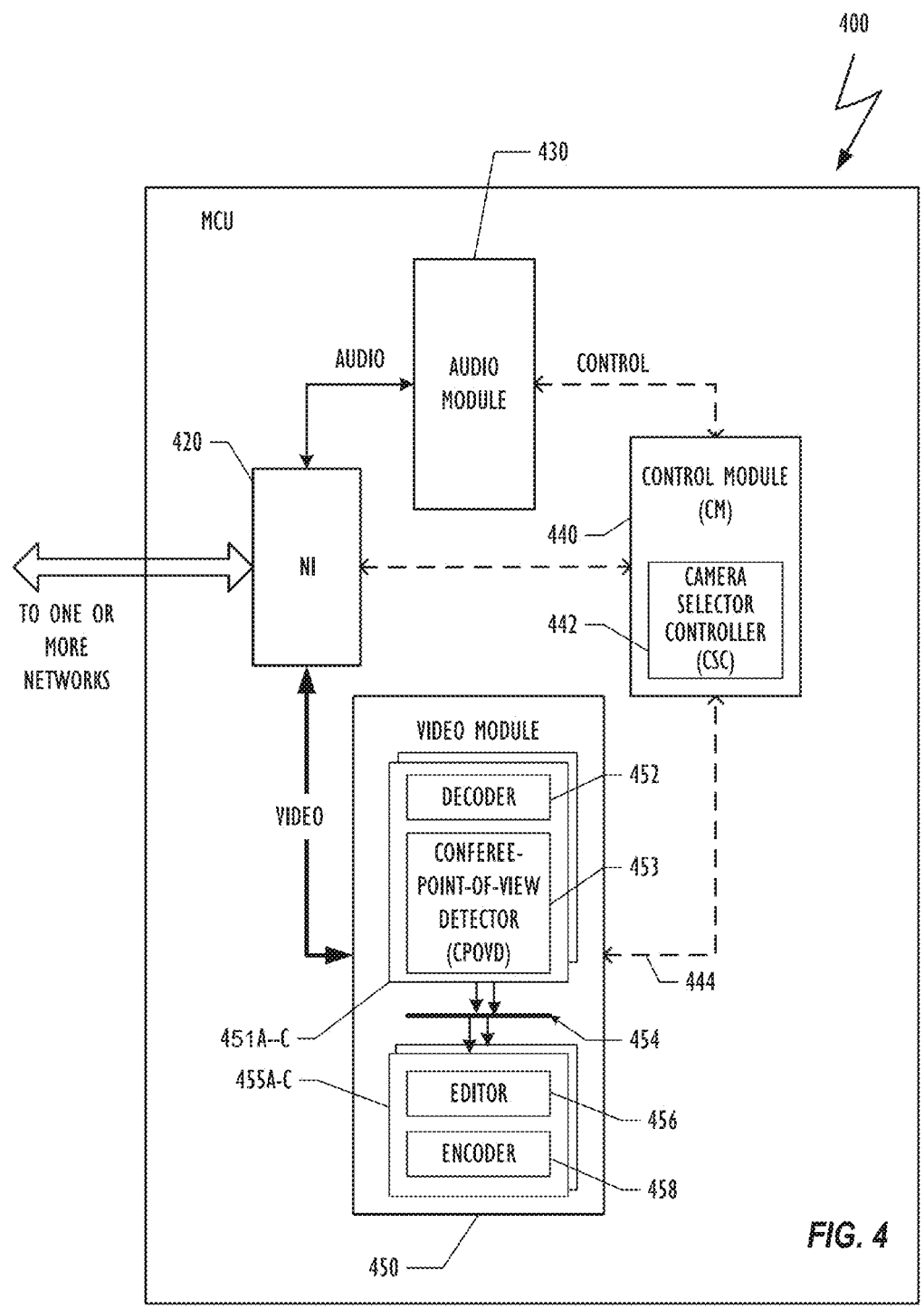
FIG. 4 is a block diagram illustrating relevant elements of an exemplary MCU, according to one embodiment.

FIG. 4 illustrates an MCU 400, which is capable of dynamically and automatically switching between a plurality of streams of video images. The plurality of streams received from a plurality of video cameras 320, 322, and 324 associated with an EP 330 located in a first site 300. The switching at the MCU 400 may be done based on the gaze of an observer, located in a second site and receives the selected video image sent from the first site via the MCU 400. MCU 400 may comprise a network interface module (NI) 420, an audio module 430, a control module (CM) 440 and a video module 450. The control module 440 may further comprise a camera selector controller (CSC) 442. The network interface module 420 may receive communication from a plurality of endpoints 130a-n via network 110. Network interface 420 may process the communication according to one or more communication standards, including H.320, H.323, SIP, etc. Network interface 420 may also process the communication according to one or more compression standards, including H.261, H.263, H.264, H.264 MVC, G.711, G.722, MPEG, etc. In addition, network interface 420 may receive and transmit control and data information to/from other MCUs and endpoints. More information concerning the communication between endpoint and the MCU over network 110 and information describing signaling, control, compression, and setting a video call may be found in the international telecommunication union (ITU) standards H.320, H.321, H.323, H.261, H.263, H.264, G.711, G.722, and MPEG etc.

Network interface module 420 may multiplex/de-multiplex the different signals, media and/or "signaling and control" that are communicated between the endpoints and the MCU. The compressed audio signals may be transferred to and from the audio module 430. The compressed video signals may be transferred to and from the video module

450. The "control and signaling" signals may be transferred to and from control module 440. Furthermore, if a distributed architecture is used, network interface module 420 may be capable of handling automatic and dynamic gaze related information that is transferred from the endpoints 130*a-n* toward the control module 440.

In one distributed architecture embodiment the automatic and dynamic gaze detection information is sent from an EP 130 to MCU 400. The gaze detection information may be sent from the EP 130 as a part of a predefined header of an RTP (Real-Transport Protocol) packet. NI 420 may be adapted to process the predefine header and to transfer the gaze detection information to the CM 440. The gaze detection information may include the angle ±a (216, 218) of the nose of the conferee from the perpendicular 210. In another embodiment, the information about the gaze of the conferee may be expresses by the location of the conferee's nose, in pixels (W;H) along the width 'W' axis, and height 'H' axis of the video image received from that conferee's EP, for example. In some embodiments, the gaze may be expressed in number of pixels in pixels (W;H) from the top left corner of the image.

In yet another distributed architecture embodiment, the EP may send information regarding the gaze of its conferee over the audio signal using dual-tone multi-frequency signaling (DTMF). In such an embodiment, the NI 420 processes the received signals and sends the compressed audio, carrying the DTMF signal toward the audio module 430. The audio module 430 decompresses the audio signal, decodes the DTMF information, and transfers the Gaze information toward the CM 440. In yet another distributed architecture embodiment, the EP 130 may send information regarding the gaze of its conferee via out of band connection. The out of band connection may be carried over an Internet Protocol (IP) network, for example. In such embodiment, the NI 420 may process the received IP packets, carried over an IP connection and sends the Gaze information toward the CM 440.

Audio module 430 may receive, via network interface 420 compressed audio streams from the plurality of endpoint 130*a-n*. The audio module 430 may decode the compressed audio streams, analyze the decoded streams, select certain streams, and mix the selected streams. The mixed stream may be compressed and the compressed audio stream may be sent to the network interface 420, which sends the compressed audio streams to the different endpoints 130*a-n*. Audio streams that are sent to different endpoints may be different. For example, the audio stream may be formatted according to a different communication standard and according to the needs of the individual endpoint. The Audio stream may not include the voice of the user associated with the endpoint to which the audio stream is sent. However, the voice of this user may be included in all other audio streams.

In some embodiments, the audio module 430 may be adapted to analyze the decoded audio signals received from the endpoints, and decodes the DTMF signals for retrieving information regarding the gaze of the conferee's whose audio signal was processed. The gaze information may be transferred to the control module 440. In some embodiments, two or more microphones may be used in a certain site.

Video module 450 may receive compressed video streams from the plurality of endpoints 130*a-n*, which are sent toward the MCU 400 via network 110 and processed by network interface (NI) 420. Video module 450 may create one or more compressed CP video images according to one or more layouts that are associated with one or more conferences currently being conducted by the MCU 400. A video module 450 may have a plurality of input modules 451*a-c*, a plurality of output modules 455*a-c* and a video common interface 454. Each input module 451*a-c* may be associated with an endpoint. Each output module 455*a-c* may be associated with one or more endpoints.

Input module 451*a-c* may include among other elements a decoder 452 and a Conferee's-Point-of-View Detector (CPOVD) 453. CPOVD 453 may be a sub-module of input modules 451*a-c*, or in an alternate embodiment, CPOVD 453 may be a sub-module of video module 450. An input module 451*a-c* may be associated with an endpoint and may process a plurality streams of compressed video images received from plurality of video cameras 320-324 that are connected to the associated endpoint 330. The decoder 452 may receive the plurality of compressed video streams, which may comprise three streams for example, from an associated endpoint and decode the compressed video stream according the compression standard H.264 MVC into three decoded video data images, each decoded image received from one of the three cameras. The ITU H264 MVC standard is a multi-view-video-coding standard, which enables the transmitting endpoint to broadcast multiple video streams from the two or more cameras. Each decoded image may be stored in a decoder frame memory from which it is transferred toward one or more output modules 455*a-c* via common interface 454. The common interface 454 may be a TDM bus, packet based bus (such as an ATM bus, IP bus), serial bus, parallel bus, connection switching, shared memory, direct connection, or any variety of these.

In an alternate embodiment in which H.264 MVC is not used, an input module may be associated with one of the cameras 320-324 of its associated endpoint 330. Thus, endpoint 330 may be associated with three input modules 451.

The MCU receives from a plurality of endpoints a plurality of compressed video streams. Some of the endpoints may send compressed video streams received from its two or more video cameras using the ITU H.264 MVC standard, while other endpoints may send a compressed video stream received from a single video camera.

In one embodiment, each of the endpoints 330 may comprise a CPOVD 453 that receives the video input data from an endpoint camera, processes the received data, and defines the direction in which the conferee is looking. The conferee point of view information may then be sent to the MCU from the endpoint. The information may be sent in-band, in association with the compressed video stream, as part of a packet's headers. Alternatively, the information may be sent out of band over a separate connection between the endpoint and the MCU, over an Internet Protocol (IP) connection, for example.

In one embodiment, the decoded data stored in the frame memory, which is associated with the central camera 322 may be sampled by the CPOVD 453. CPOVD 453 may be adapted to analyze the video image received from the central camera and to detect the gaze of the conferee that uses the associated EP 330. A CPOVD 453 may process the decoded image; identify the nose of the conferee; and determine the location of the nose compared to the perpendicular 210 to the screen, or the center of the screen. Detecting the nose may be implemented by an image-processing algorithm that identifies the two eyes and the nose in the center. In a site that has only one camera, the images from the single camera are processed instead of the video of the central camera.

In some embodiments of an MCU 400, a central CPOVD 453 may be used. Such a central CPOVD 453 may obtain the decoded video from each one of the input video ports, in parallel or in serial. Such a CPOVD 453 may process the obtained decoded video and determine the gaze angle of the conferee. The detected gaze angle may be used for selecting the appropriate camera.

In one embodiment, an MCU 400 may use a learning period for learning the properties of an organ of the conferee's face, such as a nose, an eye (left, right or both), etc. the term nose may be used as a representative term for such an organ. In addition for learning the area around the nose, the CPOVD 453 may learn the topology of the gaze (represented by the nose, for example) in relation to the video image received from the center camera and the screen of the endpoint. The learning period may begin upon receiving a request from a conferee to join the conference. During the learning period, the MCU 400 may present the self-image of the conferee, which is received from the center camera, over the entire screen of the conferee's endpoint. In addition to the self image, the MCU 400 may present above the self image three points (colored area, a circles, for example) along a virtual horizontal line starting from left to right in the middle of the height of the screen. In other embodiment, five points may be presented on the screen, one in the center of the screen, and one at the center of each quarter of the screen (i.e., the center of the top left quarter, the center of the top right quarter, the center of the bottom left and the center of the bottom right quarter).

The MCU 400, by using an interactive-video-control-human interface may place a cursor on the screen and prompt the conferee to look at the center point on the screen and to place the cursor on the conferee's nose. Prompting the conferee may be done by an Interactive Voice Response (IVR) or by presenting text instructions over the screen. After clicking on the cursor, the MCU 400 may collect information on the location of the nose and the properties in a certain area around the nose while the conferee looks at the center point. The process may be repeated for each of the colored points. In some embodiments, two or more points may be used in each side of the screen. The interactive-video-control-human interface is disclosed in U.S. Pat. No. 7,542,068, the content of which is Incorporated herein by reference in its entirety. At this point of time the CPOVD 453 has information on the location (in pixels from the top left corner of the image) of the conferee's nose in the video image received from the conferee's center camera 322 when the conferee looks at the center of the screen and at the center of each quarter of the screen. In addition, the CPOVD 453 has information on the properties of the area around the nose in each position. This information may be processed for use as filters to define the gaze of the conferee during the video session.

In yet another embodiment, the CPOVD 453 may implement a gaze detector. Gaze detection methods are well known in the art of image processing. There are a plurality of articles that describe different method of gaze detection. Some of them use a wearable device such as magnetic elements, RF receivers, and or transmitters, etc., others uses a dedicated camera for tracking and capturing the user's eyes, others just run image processing algorithms that identify the user's gaze, etc. a CPOVD 453 may use a commercial gaze detector. Example commercial gaze detection systems include SMI RED systems RED, RED 250, and RED 500, manufactured by SensoMotoric Instruments GmbH (SMI) from Teltow Germany. Other gaze detection systems use the red-eye effect by using a near infrared lighting source. Gaze detection techniques are known to the art and will not be further discussed herein.

Various embodiments may implement different techniques of gaze detection. Some embodiments may use near infrared (NIR) lighting and analyzing the received video image looking for the red-eye effect on the image. Other embodiments may implement image-processing methods looking for changes in the gaze direction. The information about the current gaze direction of the conferee in a receiving endpoint, or changes in the gaze directions may be utilized for controlling the video image received from a transmitting endpoint such that the transmitted image is adapted to the gaze of the receiving endpoint.

In some embodiments, if two or more conferees share the same site and the same endpoint, one of them may be selected as the one to whom the gaze detector will respond. The selection of the conferee may be done automatically in one embodiment. The selection criteria that may be used may include the conferee that sits in the head of the table, the conferee that sits in the center of the group of conferees, the conferee that sits closest to the camera, etc. In other embodiments, the conferee may be selected manually during the beginning of the conference session, for example when in the learning mode.

From time to time, periodically, and/or upon receiving a command from the CSC 442, the CPOVD 453 may sample a captured frame of the decoded video. The CPOVD may analyze the sampled image and identify the direction of the conferee's gaze. The CPOVD 453 may output the gaze detected information to the CSC 442 via control line 444.

The received conferee's point of view information may be stored at the MCU controller. This information may be used for controlling a video output port that has been assigned to that received conferee. When the MCU controller determines that video image received from a transmitting endpoint having two or more cameras is to be transmitted toward the endpoint of the received conferee, then the information regarding the received conferee's point of view may be used for selecting an appropriate video stream of the video streams received from the two or more video cameras of the transmitting endpoint.

In some embodiments, the CPOVD 453 may deliver parameters according to the location of the nose. The nose represents the center of the gaze of the conferee. The location may be in pixels. In some embodiments of the video module 450, a single CPOVD 453 may be used. Such a CPOVD 453 may be a separate module external to the input module 451*a-c*. In such embodiment, the CPOVD 453 may obtain from the common interface 454 a decoded video frame received from one of the input modules 451*a-c*, process it, and deliver gaze information to the CSC 442. Then, the CPOVD 453 may obtain decoded frame received from a next input module 451*a-c*, process it, deliver gaze information and may continue to the following input module, looping repeatedly. In a distributed architecture, a CPOVD 453 may be located in an endpoint 330 and may process the video data generated by its central video camera 322. More information about the operation of a CPOVD 453 is discussed below in conjunction with FIG. 5.

Among other elements, an exemplary output module 455*a-c* may include an editor 456 and an encoder 458. Editor 456 may get decoded data of selected video images from the common interface 454 to be composed into a CP image created by the output module 455. The editor 456 may scale, crop, and place the video data of each conferee into an editor frame memory according to the location and the size of the image in the layout associated with the composed video of the CP image. Editor 456 and encoder 458 may each be considered as modules, or as sub-modules of output modules 455a-c.

When the editor frame memory is ready with all the selected conferee's images, the data in the frame memory is ready to be encoded by encoder 458 and sent toward its associated endpoint. The editor 456 may be configured to collect the decoded video images received from a plurality of endpoints (video input modules 451a-c), to build the frames of the CP video images based on layout instructions received from the CM 440 regarding each video image, and send the composed CP video image toward a display unit of the endpoint.

Depending on the current layout that is transmitted toward the received conferee, the conferee's video output port may arrange the selected video stream in a segment of a CP video image or as a switching video image and send it toward the receiving endpoint. In some embodiments, the 3D imitation may be limited to images that are displayed in a segment bigger than a certain size, a quarter of a screen for example.

Additional functions that may be included in the video module 450 are described in U.S. patent application Ser. No. 10/144,561; U.S. Pat. No. 6,100,973; and International App. Serial No. PCT/IL01/00757, the contents of which are incorporated herein by reference. In a distributed architecture, an endpoint may include an editor 456. In such embodiment, the editor 456 may be located after a decoder of the endpoint.

In addition to the operation of an editor 456 in an output module, editor 456 may be able to adapt the video image presented in at least one segment of the CP video image to the gaze of the conferee that is associated with that editor 456 and receives that CP video image. This conferee is referred to as the receiving conferee. An exemplary embodiment of an editor 456 may adapt the video image in the current speaker segment to the gaze of the receiving conferee looking at the speaker image in the CP video image. To do so, the editor 456 may obtain from CSC 442 information about which one of the three video cameras 320-324 of the endpoint of the current speaker fits the gaze of the receiving conferee. During a transition from one camera to another camera of the same endpoint, different techniques may be used to overcome transition digital artifacts caused by the difference between the positions of the cameras, including morphing techniques for smoothing the transition. The morphing technique may provide a perception of a smooth transition. Morphing techniques are well known in the video processing arts and have been used for more than twenty years. Other techniques that may be used include fading-in effects, fading-out effects, etc.

Furthermore, in order to avoid jumping from one camera to the other and vice versa, an embodiment may have an overlap between two adjacent cameras and may use hysteresis in the decision thresholds for selecting a camera based on the receiving conferee's point of view. Consequently, the changing point from a right camera to a left camera may be other than the changing point from the left camera to the right one.

In addition, some embodiments after changing the selected camera, a time delay may be implemented for a certain period, for example a few seconds, in which the selected video camera is not changed again.

Control module 440 may be a logical unit that controls the operation of the MCU 400 and conducts the conference session. In addition to conventional operation of a typical MCU, MCU 400 according to various embodiments may be capable of additional functionality as result of having the control module 440. Control module 440 may include a Camera-Selector Controller (CSC) 442. In one embodiment, a CSC 442 may control a plurality of video output modules 455a-c. In other embodiments, each of a plurality of CSC 442 controls an output module 455a-c. Per each output module 455, a CSC 442 may receive gaze information of the conferee associated with the EP that is associated with that output module 455. The gaze information may include the view angle ±a 216, 218 of the conferee from the perpendicular 210 to the conferee's screen. In other embodiments, the gaze information may be the coordinates (W;H, Width; Height) of the nose of the conferees in pixels along the width axis (W) and the height (H) axis of the conferee's self image received from the center camera 322 of the conferee's EP 330, etc.

In other embodiments, an MCU for media relay video conferencing (a media relay MCU or MRM) may use a distributed architecture as described herein. In such an architecture, the endpoints 330 may comprise the gaze detector and the editor. The gaze detector may process the video image received from one of the cameras 320, 322, and 324 of the endpoint 330 to define the gaze of the conferee and transfer the gaze information toward the CSC 442 that is located in the MRM. The editor may select one of the decoded streams from the endpoint decoder 452 that were received from a transmitting endpoint to which the gaze of the conferee pointed, according to instructions obtained from the CSC 442, and embed the selected stream in a CP video image that may be presented on the endpoint display unit. A reader who wishes to learn more about media relay video conferencing and MRM is invited to read US Patent Application Publication No. 2010/0194847, the content of which is incorporated herein by reference.

After collecting the information on the conferee's gaze and the layout that is currently presented to that conferee, the CSC 442 may determine the segment at which the conferee is looking. Then, CSC 442 may determine which camera (320, 322, or 324) of the endpoint 330 that is associated with this segment matches the direction of the conferee's gaze. If the conferee looks to the left side of the segment, then camera 320 may be selected. If the conferee looks to the right side of the segment, then camera 324 may be selected, and if to the center of the segment then camera 322 may be selected. Information on the selected camera may be transferred to the editor 456 of the output module 455 that is assigned to that conferee. The information may include information how to obtain the decoded data from the common interface 454 and instead of each stream to place this image in the CP video image. More information on CSC is disclosed below in conjunction with FIG. 5.

In some embodiments, a single CSC 442 may control a plurality of editors 456. In other embodiments, a plurality of CSCs 442 each control one of the plurality of editors 456. The CSC 442 may calculate the scaling, cropping, and movement when moving from one camera to another.

Based on this information, the editor 456 starts the replacing process. In some embodiments, replacing images from two different cameras in the same room may take few frames in order to smooth the transition. An exemplary embodiment may use a fading technique in which the old image is faded while the image from the selected camera is increased. Other embodiment may use a morphing technique to provide a perception of a smooth transition, etc.

Figure 5:
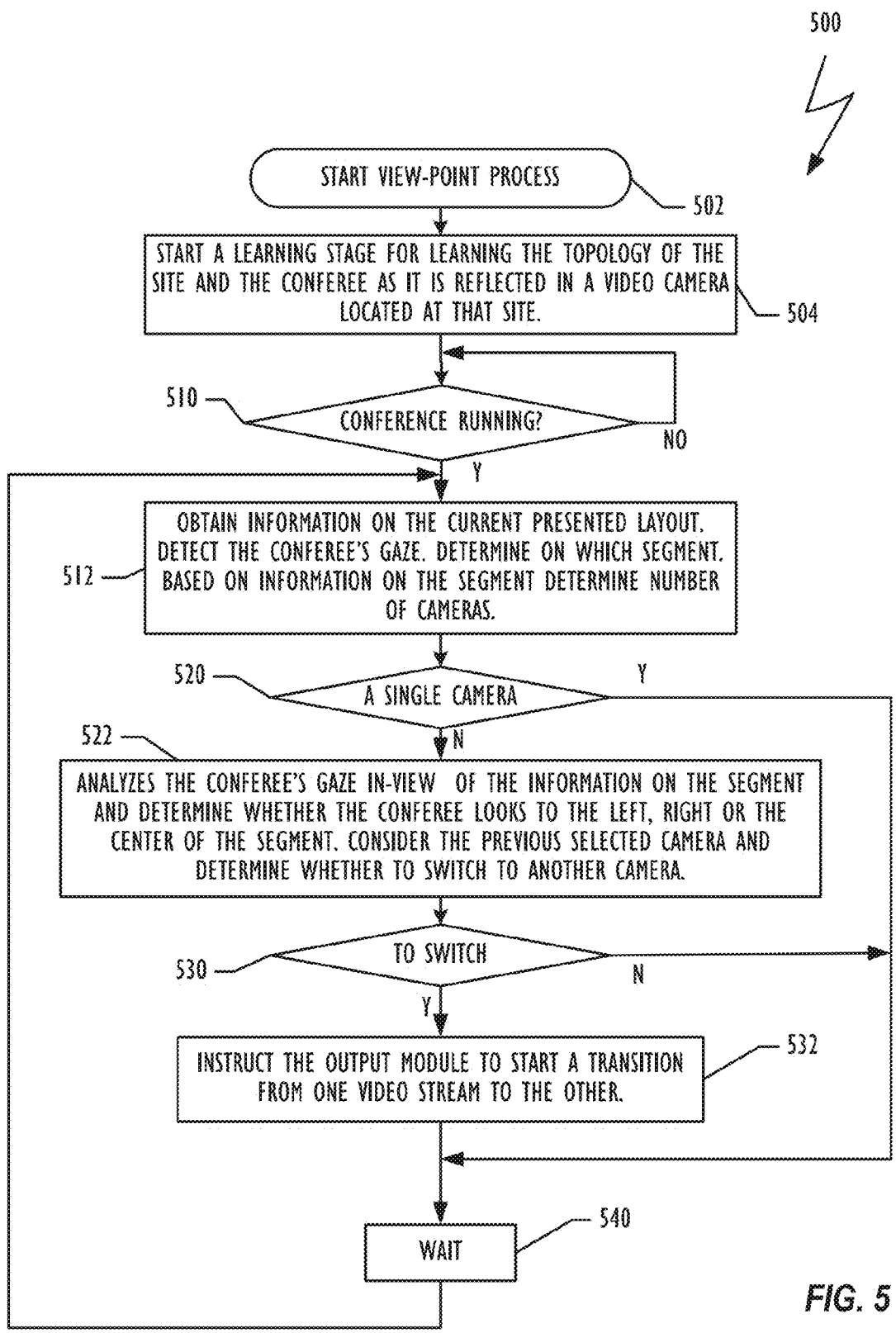
FIG. 5 is a flowchart illustrating relevant actions of a process for selecting a camera based on conferee point of view, according to one embodiment.

FIG. 5 is a flowchart illustrating relevant actions of process 500. Process 500 may be implemented by a CPOVD 453 for defining the gaze of the conferee that is associated with that CPOVD 453 and selecting a camera, in a second room, based on the conferee's s point of view. In this embodiment, the conferee resides at a first site, and is referred as a first conferee, while the cameras (320, 322, and 324) are located at a second site 300. In one embodiment, process 500 may change cameras only if the first conferee looks at the segment of the current speaker. Other embodiments may switch between cameras even if the first conferee looks at a segment other than the segment of current speaker in the CP video image.

The process may be initiated in block 502 by CSC 442 when the first conferee joins the conference. Upon initiation in block 502, a learning period may be executed by the CPU of the CPOVD in block 504. During the learning period in block 504, the CPOVD 453 may learn the topology of the first site as it is reflected in a video image received from a camera in the first site. The camera may be the center camera if the endpoint in the first room has three cameras; otherwise, where only one camera exists at the first site, the camera may be the only camera used in the first site. Learning the topology may include identifying the location of the first conferee in the self-image, associating the gaze as it is expressed on the image with a location on the screen on which the conferee looks, etc. Learning the topology may be done automatically by prompting the conferee to look at a different location on the screen and determining the conferee's gaze at each time. In some embodiments, learning the topology may be performed semi-automatically, where the conferee is requested to look on a certain location on the screen and to point with a cursor on an organ on the image of the conferee's face, putting the cursor on an eye, the nose, etc.

At the end of the learning period, a decision may be made in block 510 whether the conference is running. The conference may be considered as running when the video image presented over the screen of the first endpoint is received from at least one other site. If not running, process 500 waits until the conference begins to run. If in block 510 the conference is running, then information on the current presented layout on the first screen is obtained in block 512 from CSC 442. The information may include the coordinates of the top left and bottom right of each segment, the coordinates, in pixels (Wc;Hc), of the center of each segment, the number of cameras in the site of that segment, etc. The CPOVD 453, which is associated with the input module 451 that is assigned to the first endpoint, may obtain a decoded video stream that was received from the center camera of the first endpoint in order to detect in block 512 the gaze of the first conferee.

Detecting the gaze may be done by one or more of the techniques that are described above. The gazing point on the screen of the first endpoint may be expressed in pixels (Wg;Hg) from the top left corner of the screen. Based on the coordinates of the gazing point (Wg;Hg) on the screen of the first endpoint and the obtained information on the layout present on that screen, process 500 may determine in block 512 the segment at which the first conferee is looking Based on the information obtained on that segment in block 504, a decision is made in block 520 whether the remote site (the site that is presented in that observed segment) has a single camera. If so, process 500 waits in block 540 for a predetermined period of time. The predetermined period of time may be a configurable period between few tens of milliseconds to few seconds, for example. After the waiting period of block 540 process 500 returns to block 512 and starts a new cycle of adapting the presented image to the gaze of the conferee.

If in block 520 the remote site has more than one camera, then process 500 proceeds to block 522 in which the CPOVD 453 determines, based on the detected coordinates (Wg;Hg) of the first conferee's gaze and the coordinates of the center of the relevant segment (Wc;Hc), whether the first conferee looks at the center of the segment, the left side, or the right side of the segment. In one embodiment, the decision may be made by using two values as thresholds A1 and A2 wherein the absolute value of A2 is larger than A1. The values of A1 and A2 may depend on the size of the segment, where the bigger the segment the bigger the values of A1 and A2.

In order to determine in block 522 whether the first conferee looks at the center of the segment, a CPOVD 453 may calculate the value of (Wc−Wg). If the absolute value is smaller than A1, then CPOVD 453 may decide that the first conferee looks at the center of the segment. Thus, the current selected camera in the remote site is the center camera 322. To determine whether the first conferee looks at the left side of the segment, CPOVD 453 may check if Wg<(Wc−A2). If so, then CPOVD 453 may decide that the first conferee looks at the left side of the segment and the right camera 324 may be selected to match the gaze. In order to determine whether the first conferee looks at the right side of the segment, CPOVD 453 may check if Wg>(Wc+A2). If so, then CPOVD 453 may decide that the first conferee looks at the right side of the segment. Thus, the current selected camera in the remote site is the left camera 324.

The CPOVD 453 may then determine whether there is a need to switch from the previous selected camera to the current selected camera. If in block 530 the previous selected camera is the same as the current selected camera, then there is no need to switch cameras and process 500 continues to block 540. The decisions may be established according to various predetermined criteria, including a predefined change in the angle of the viewer's point of view, a predefined angle from which a certain camera's input is to be chosen; etc. If there is a need to switch cameras, then an instruction may be sent in block 532 to the editor module 456 to start the transition from the video stream received from the previous selected camera to the video stream received from the current selected camera. The instruction may be sent via the CSC 442. After instructing the editor 456, process 500 may wait in block 540 before starting a new cycle from block 512.

In one embodiment of method 500, block 522 may further consider whether the video image of the transmitting endpoint was cropped along the width axis before being placed in the segment of the CP layout. If it was, the CSC 442 may check if the cropping area can be slightly moved in the direction that leads the Wg toward the Wc of the segment. Only after sliding the cropped image under the segment, CPOVD 453 may then determine whether there is a need to switch from the previous selected stream (camera) of the transmitting endpoint to the current selected stream (camera of the transmitting endpoint).

Although the description above is written in terms of selecting a camera, one skilled in the art will recognize that a selection of a camera may be accomplished by selecting a video stream that is generated by the camera. Therefore, the terms selecting a video stream and selecting a camera may be considered as interchangeable terms.

It is to be understood that the above description is intended to be illustrative, and not restrictive. The above-described apparatus, systems, and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different exemplary embodiments along the discloser. The scope of the invention is limited only by the following claims and equivalents thereof.

What is claimed is:

1. A communication apparatus comprising:
    a display;
    one or more cameras positioned with the display and configured to image a user;
    a point-of-view detector that determines a gaze of the user relative to the display from images obtained from the one or more cameras; and
    an editor, communicatively coupled to the point-of-view detector, that builds an image for presentation to the user on the display responsive to the gaze of the user.

2. The communication apparatus of claim 1, further comprising:
    a control module coupled to the point-of-view detector, configured to design a layout and to provide information to the point-of-view detector on each segment of the layout.

3. The communication apparatus of claim 1, wherein the point-of-view detector is configured to:
    detect the gaze of the user on the image presented to the user on the display;
    determine a segment of the image at which the user is looking; and
    make a selection corresponding to the determined segment.

4. The communication apparatus of claim 1, wherein the point-of-view detector determines a gaze of the user as an angle relative to a perpendicular orientation to the display.

5. The communication apparatus of claim 1, wherein the point-of-view detector determines a gaze of the user as a two-dimensional pixel count relative to a predetermined position on the image presented to the user on the display.

6. The communication apparatus of claim 1, wherein the one or more cameras include at least one camera responsive to near infra red light and wherein the point-of-view detector is responsive to near infra red information received from at least one camera responsive to near infra red light to determine a gaze of the user.

7. A method comprising:
    determining a gaze of a user relative to a display of a communication device associated with the user;
    making a selection responsive to the gaze of the user; and
    building an image for presentation to the user on the display from the selection.

8. The method of claim 7, wherein determining a gaze of a user relative to the display further comprises:
    receiving one or more images from one or more cameras positioned adjacent the display; and
    determining the gaze of the user from the received images.

9. The method of claim 8, wherein determining a gaze of a user relative to the display further comprises:
    determining which of a plurality of segments of a layout is looked at by the first conferee.

10. The method of claim 7, further comprising:
    detecting a change in the gaze of the first conferee;
    making a different selection responsive to the change in the gaze of the user; and
    building a new image for presentation to the user on the display based on the different selection.

11. The method of claim 10, wherein the act of detecting a change in the gaze of the first conferee is performed periodically.

12. The method of claim 10, wherein making a different selection responsive to the change in the gaze of the user further comprises:
    determining whether the change in gaze of the user meets a predetermined criteria; and
    not making a different selection if the change in gaze of the user does not meet the predetermined criteria.

13. The method of claim 10, wherein building a new image for presentation to the user on the display comprises:
    smoothing a transition between the image for presentation to the user on the display and the new image for presentation to the user on the display.

14. The method of claim 13, wherein smoothing the transition between the image for presentation to the user on the display and the new image for presentation to the user on the display comprises morphing the images.

* * * * *